No. 747,705. PATENTED DEC. 22, 1903.
J. HEINRICHS.
COFFEE POT.
APPLICATION FILED MAY 6, 1901. RENEWED MAY 4, 1903.
NO MODEL.
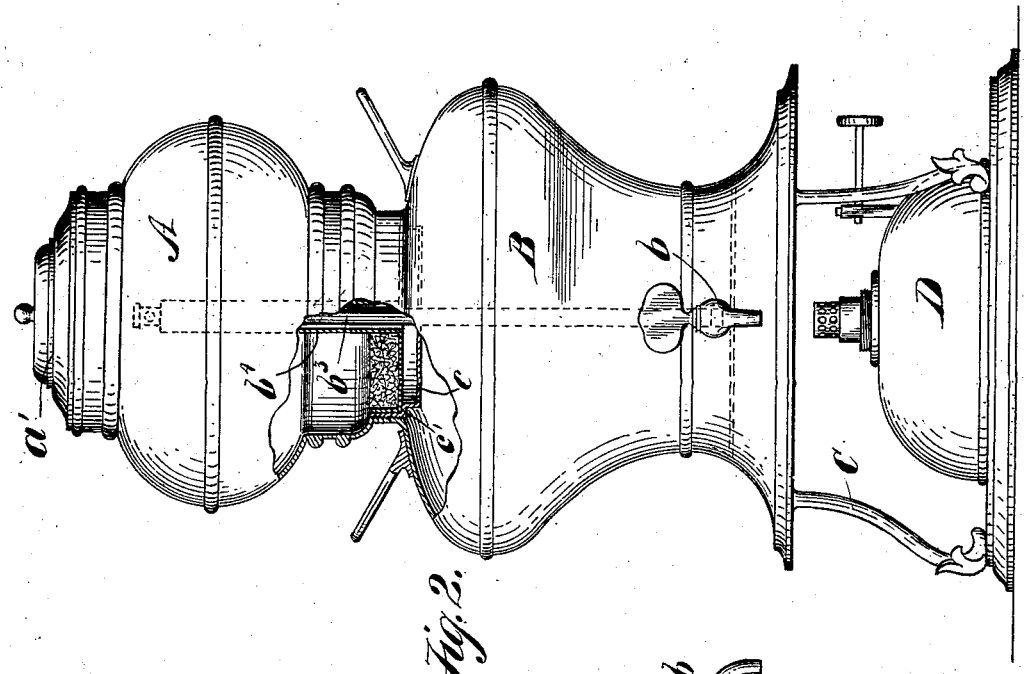
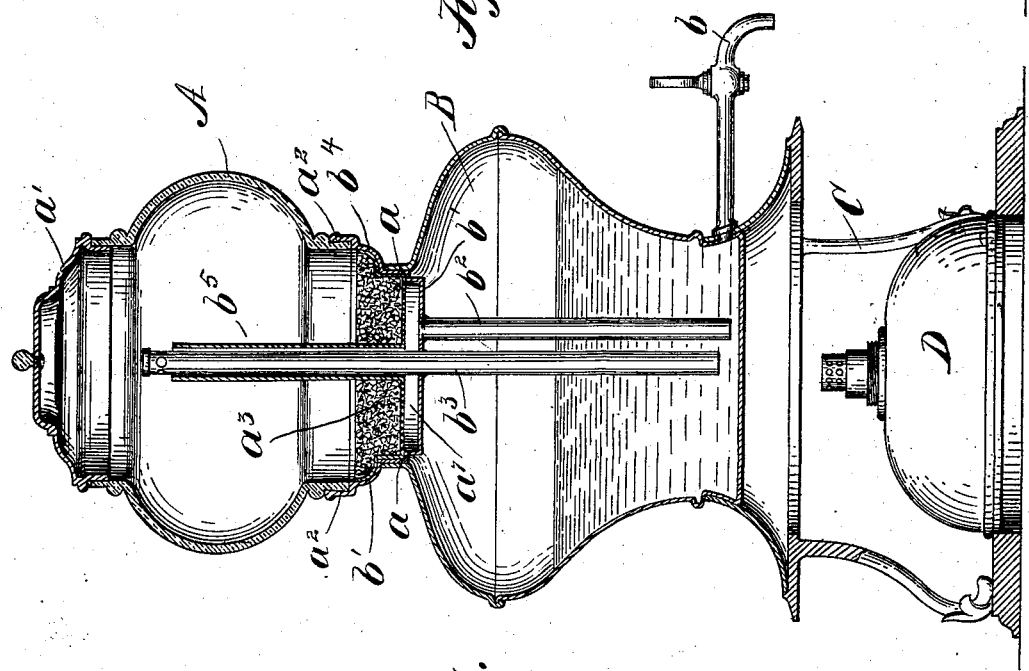
WITNESSES:
INVENTOR,
BY
ATTORNEY No. 747,705.

Patented December 22, 1903.

UNITED STATES PATENT OFFICE.

JOSEPH HEINRICHS, OF NEW YORK, N. Y.

COFFEE-POT.

SPECIFICATION forming part of Letters Patent No. 747,705, dated December 22, 1903.

Application filed May 6, 1901. Renewed May 4, 1903. Serial No. 155,681. (No model.)

*To all whom it may concern:*

Be it known that I, JOSEPH HEINRICHS, a citizen of the United States, and a resident of New York city, county of New York, and State of New York, have invented certain new and useful Improvements in Coffee-Pots, of which the following is a specification, reference being had to the accompanying drawings, forming a part thereof, in which similar letters of reference indicate corresponding parts.

My invention relates to improvements in steam coffee or tea pots, and has reference to that class of device in which the water is passed through a filter containing coffee or tea continuously by the action of the steam generated by means of heat beneath the lower water-compartment.

The object of my invention is to provide a device of the character described which will be quick in action, embody economy in cost of manufacture, and possess the particular advantage of properly filtering the water in the course of operation. I attain these objects by the device illustrated in the accompanying drawings, in which—

Figure 1 is a vertical section through my device, and Fig. 2 is an exterior elevation shown partly in section to better illustrate a slight constructional modification.

A designates an upper compartment attached by a water-tight joint at $a$ to a lower water-compartment B, having a draw-off cock $b$.

The upper compartment A is provided with a suitable cover $a'$, fitting loosely upon the compartment or chamber to provide for and allow the egress and ingress of air, and the entire apparatus sets upon an open stand C, and directly beneath the compartment or chamber B upon the base of the stand C, I place any suitable heater, such as the lamp D.

The lower end of the compartment or chamber A is constructed of metal in the form of a cup $b'$, which is attached by a hermetically-sealed joint at $a^2$. Extending downwardly from the bottom of the cup $b'$ and securely fastened at its upper end to the cup is a tube $b^2$, open at both ends and reaching nearly to the bottom of the compartment B. A second tube $b^3$, open at both ends, is securely fastened intermediate its length to the bottom of the cup $b'$ and extends upwardly into the upper compartment A almost to the top of same and downwardly into the lower compartment B, not quite as far as the tube $b^2$, the lower ends of the two tubes lying in different horizontal planes, as will be clearly seen in Fig. 1 of the drawings. The cup end $b'$ is formed with a ledge $b^4$, upon which a receptacle $a^3$, containing ground coffee or tea, is adapted to rest. The bottom of the coffee or tea receptacle is perforated or foraminous and has an upwardly-extending sleeve $b^5$ securely fastened to it, the tube $b^3$ passing through said sleeve.

To operate my device, heat is applied to the bottom of the lower compartment B by means of an alcohol-lamp D or other suitable means. Steam is generated in the upper part of the compartment B and in expanding drives the water up through the tubes $b^3$ and $b^2$ into the compartment A, where it remains until the water in the compartment B reaches the level of the end of the tube $b^3$, when the steam passing up through the tube allows the water to run back into the compartment B through the pipe $b^2$, first passing through the ground coffee contained within the receptacle $a^3$. By the time the water has all reëntered the compartment B steam again begins to form, and the circuit of the water is repeated and continuous until the coffee has reached the desired strength, when the flame from the lamp is reduced, so that the operation ceases and only sufficient heat is generated to keep the coffee at the desired temperature. The space $a^7$, formed between the receptacle $a^3$ and the bottom of the cup $b'$, allows the water to pass very quickly through the coffee-receptacle, and the liquid in its passage through the coffee is thoroughly filtered. This filtering process produces a coffee that is absolutely pure and rich in flavor and is one of the features of my invention.

In Fig. 2 I show a slight modification, in which I form the upper and lower compartments A and B integrally and securely fasten a separating-partition c, to which is fastened the tubes $b^2$ and $b^3$. I form upon this separating-partition a ledge $c'$, which corresponds to and has the same function as the ledge $b^4$ in Fig. 1. In this modification the compartments A and B are necessarily made of the same material, preferably sheet metal.

Having thus described my invention, what I claim as new, and desire to secure by Letters Patent, is—

1. In a device of the class described, an upper and a lower chamber suitably connected, a cover for closing said upper chamber, a receptacle having a perforated bottom, adapted to rest in the bottom of the said upper chamber, a sleeve fastened to the said receptacle, and extending upwardly into the said upper chamber, a tube fastened to and passing upward into the upper chamber and extending downwardly into the lower chamber, almost to the bottom of the latter; the said tube passing through said sleeve, said tube being closed at its extreme upper end, and having a series of lateral openings at such upper end, and a second tube fastened at one end to and extending downwardly from the bottom of said upper chamber into the said lower chamber almost to the bottom of the same, the aforesaid lower chamber being adapted to contain a liquid which is forced into the upper compartment through both the tubes by the action of the steam generated when the liquid is heated to the boiling-point, substantially as set forth.

2. The combination of a plurality of chambers, one superposed upon another, a coffee-containing receptacle positioned in one of said chambers, a tube secured at its upper end to the bottom of the upper chamber, and terminating near the bottom of the lower chamber, and a second tube extending from a point near the bottom of the lower chamber to a point near the top of the upper chamber, said second tube being provided with a series of lateral orifices, the construction being such that a liquid may be sprayed upon the material in the receptacle through the orifices in the tube, and simultaneously forced up the tube which is secured at its upper end to the bottom of the upper chamber, and upward through the material in the receptacle, substantially as set forth.

3. The combination of a plurality of chambers, one superposed upon another, a coffee-receptacle having a foraminous bottom, a sleeve extending upward from said foraminous bottom, a tube extending from the lower chamber through the sleeve into the upper chamber, said tube having orifices formed near the upper portion thereof for causing liquid ascending the tube to be sprayed upon the material in the coffee-receptacle, and means for conducting the liquid from a point below said receptacle upward and through the material in the receptacle, substantially as set forth.

4. The combination of a plurality of chambers, one superposed upon another, the lower chamber adapted to contain a liquid, a receptacle adapted to contain material from which the decoction is made, means for conducting the liquid from the lower chamber upward through the material in the receptacle, and means for simultaneously conducting liquid from the lower chamber to a point above the receptacle and spraying said liquid down upon the material in such receptacle, substantially as set forth.

5. The combination of a casing, a receptacle designed to contain the material from which the decoction is to be made, means for conveying liquid from the bottom of the casing upward through the material into the receptacle, and means for simultaneously spraying liquid from a point above the receptacle downward upon the material therein, substantially as set forth.

6. In a device of the class described, a receptacle provided with a foraminous bottom, means for conducting liquid to a point above the receptacle and spraying such liquid down upon material in the receptacle, and means for directing the liquid upward through the foraminous bottom and through the material in the receptacle, substantially as set forth.

7. The combination of an upper and lower chamber, connected by a hermetically-sealed joint, a coffee-receptacle located in the bottom of the upper chamber, a tube secured to and extending downwardly from the bottom of the upper chamber into the lower chamber and terminating at a point adjacent to the bottom of the same, a second tube secured to the bottom of the upper chamber and extending upwardly through the coffee-receptacle into the upper chamber and downwardly into the lower chamber, said tube having passageways therein for the escape of ascending liquid, the construction being such that said liquid will be sprayed downwardly upon the coffee in the receptacle, substantially as set forth.

8. The combination of an upper and lower chamber, connected by a hermetically-sealed joint, a coffee-receptacle adapted to seat upon a ledge formed on the upper chamber a short distance from the bottom, the construction being such that a space is formed between the coffee-receptacle and the bottom of the upper chamber, a foraminous bottom for said coffee-receptacle, a tube secured to and extending downwardly from the bottom of the upper chamber into the lower chamber, a second tube secured to the bottom of the upper chamber, and extending upwardly through the coffee-receptacle into the upper chamber, and downwardly into the lower chamber, said tube having lateral orifices therein for the escape of liquid ascending tube from the lower receptacle, a portion of said liquid passing through the first-mentioned tube upward through the foraminous bottom of the receptacle, and means for heating the liquid in the lower chamber, substantially as set forth.

In testimony that I claim the foregoing as my invention I have signed my name, in presence of two witnesses, this 29th day of April, 1901.

JOSEPH HEINRICHS.

Witnesses:
S. S. SUGAR,
B. McCOMB.